United States Patent
An (10) Patent No.: US 12,355,093 B2
(45) Date of Patent: Jul. 8, 2025

(54) BATTERY PACK HAVING STRUCTURE FOR PREVENTING LOOSENING OF HANDLE

(71) Applicant: LG Energy Solution, Ltd., Seoul (KR)

(72) Inventor: Ji-Myong An, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 585 days.

(21) Appl. No.: 17/763,489

(22) PCT Filed: Mar. 11, 2021

(86) PCT No.: PCT/KR2021/003049
§ 371 (c)(1),
(2) Date: Mar. 24, 2022

(87) PCT Pub. No.: WO2021/194138
PCT Pub. Date: Sep. 30, 2021

(65) Prior Publication Data
US 2022/0336907 A1    Oct. 20, 2022

(30) Foreign Application Priority Data
Mar. 25, 2020  (KR) .................. 10-2020-0036401

(51) Int. Cl.
*H01M 50/256* (2021.01)
*H01M 50/249* (2021.01)
*H01M 50/262* (2021.01)

(52) U.S. Cl.
CPC ....... *H01M 50/256* (2021.01); *H01M 50/249* (2021.01); *H01M 50/262* (2021.01)

(58) Field of Classification Search
CPC ............ H01M 50/256; H01M 50/249; H01M 50/262; H01M 50/20; H01M 50/271
(Continued)

(56) References Cited

U.S. PATENT DOCUMENTS 5,676,511 A    10/1997  Meylan
2016/0035497 A1    2/2016  Sengoku et al.
(Continued)

FOREIGN PATENT DOCUMENTS

CN    2640048 Y    9/2004
CN    202977656 U    6/2013
(Continued)

OTHER PUBLICATIONS

Turn Fastener Premium Eyelet 4-prong with 4-hole Clinch Washer. Datasheet [online]. Canvastraining, 2017 [retrieved on Aug. 22, 2024]. Retrieved from the Internet: <URL: https://canvastraining.com/product/turn-fastener-premium-eyelet-4-prong-4-hole-washer/>. ( Year: 2017).*
(Continued)

*Primary Examiner* — Nicholas A Smith
*Assistant Examiner* — Kevin Nguyen
(74) *Attorney, Agent, or Firm* — Morgan, Lewis & Bockius LLP (57) ABSTRACT

Disclosed is a battery pack, which includes a case configured to accommodate battery cells; and a handle attached to an outer side of the case, wherein the handle includes a handle bottom cover fixedly coupled to the case by a screw member; a handle plate disposed on the handle bottom cover and having a hole through which the screw member passes; and a handle top cover configured to cover the handle plate and coupled to the handle bottom cover, wherein the handle plate has a thread formed in the hole, and wherein the handle top cover includes a screw loosening prevention member protruding from an inner surface thereof and configured to press a top end of the screw member at an upper surface of the handle plate.

14 Claims, 6 Drawing Sheets

(58) Field of Classification Search
USPC .......................................................... 429/187
See application file for complete search history.

(56) References Cited

U.S. PATENT DOCUMENTS

| | | | |
|---|---|---|---|
| 2018/0102517 A1 | 4/2018 | Tononishi | |
| 2018/0175341 A1* | 6/2018 | Kim | .................... H01M 50/262 |
| 2019/0003690 A1* | 1/2019 | Groenke | ............. F21V 19/0055 |
| 2019/0386258 A1 | 12/2019 | Lai et al. | |
| 2020/0083503 A1 | 3/2020 | An | |

FOREIGN PATENT DOCUMENTS

| | | | |
|---|---|---|---|
| CN | 206259511 U | | 6/2017 |
| CN | 207332529 U | | 5/2018 |
| CN | 209592091 U | | 11/2019 |
| CN | 110612618 A | | 12/2019 |
| EP | 3309903 B1 | | 1/2020 |
| JP | H06-330925 A | | 11/1994 |
| JP | H07-139535 A | | 5/1995 |
| JP | 2009-204153 A | | 9/2009 |
| JP | 3176671 U | | 6/2012 |
| JP | 2014-179289 A | | 9/2014 |
| JP | 2018-063944 A | | 4/2018 |
| JP | 3220693 U | | 3/2019 |
| JP | 3223625 U | | 10/2019 |
| KR | 20-0432713 Y1 | | 12/2006 |
| KR | 20-2013-0002930 U | | 5/2013 |
| KR | 20130089095 A1 * | | 8/2013 |
| KR | 10-2014-0059385 A | | 5/2014 |
| KR | 10-2016-0049358 A | | 5/2016 |
| KR | 10-1788985 B1 | | 10/2017 |
| KR | 10-2017-0138200 A | | 12/2017 |
| WO | 2019/064721 A1 | | 4/2019 |

OTHER PUBLICATIONS

Fasnap 4 Prong Eyelet with Washer. Datasheet [online]. BLACKBURNMARINE [retrieved on Aug. 22, 2024]. Retrieved from the Internet: <URL: https://www.blackburnmarine.com/product/9560/fasnap-4-prong-eyelet-with-washer>. (Year: 2024).*

International Search Report (with partial English translation) and Written Opinion issued in corresponding International Patent Application No. PCT/KR2021/003049 dated Jun. 29, 2021.

Extended European Search Report issued in corresponding European Patent Application No. 21776173.3 dated Dec. 2, 2022.

Office Action issued Sep. 12, 2023 for counterpart Chinese Patent Application No. 202180005684.2.

* cited by examiner

BATTERY PACK HAVING STRUCTURE FOR PREVENTING LOOSENING OF HANDLE

TECHNICAL FIELD

The present disclosure relates to a battery pack having a handle, and more particularly, to a battery pack having a handle mounting structure with excellent vibration resistance.

The present application claims priority to Korean Patent Application No. 10-2020-0036401 filed on Mar. 25, 2020 in the Republic of Korea, the disclosures of which are incorporated herein by reference.

BACKGROUND ART

A secondary battery is widely used as a power source not only for small electronic devices such as mobile devices, laptops and cameras, but also recently for electric scooters (E-scooters), electric vehicles (EV), hybrid electric vehicles (HEV), and the like, which are attracting attention as alternatives to scooters or vehicles using fossil fuels.

A small electronic device is equipped with one secondary battery cell or two to four secondary battery cells, but a medium or large device such as an electric scooter or an electric vehicle is equipped with a secondary battery pack. The secondary battery pack includes at least one secondary battery module, and the secondary battery module includes a plurality of secondary battery cells.

In addition, the secondary battery pack may be configured to further include various devices (for example, a BMS, a current sensor, a fuse, etc.) for controlling the charging and discharging of the secondary battery module and a pack case for safely accommodating the various devices.

Meanwhile, a handle is sometimes attached to a pack case so that the battery pack may be easily transported and installed. In particular, since a battery pack mounted to an electric scooter is relatively small compared to a battery pack mounted to an electric vehicle, a handle is often attached to the pack case for the convenience of a user who carries the battery pack.

In most cases, the handle is attached in a hook-type method or a bolt-type method. Among them, the bolt-type method is more preferred because the hook-type method has weaker impact resistance than the bolt-type method. Patent Document 1 (JP 3223625 U) and Patent Document 2 (KR 20-0432713) disclose an example in which a handle is attached to a case in a bolt type, respectively.

However, in the handle fixing structure of a bolt type according to the prior art, a gap may be generated between the handle and the case due to the phenomenon that the screw is loosened due to the torque applied by vibration. Since the small battery pack for an electric scooter is used in an environment that is continuously subjected to vibration, a vibration test is performed after the product is completed. At this time, the product defect rate caused by the gap of the handle is not small.

DISCLOSURE

Technical Problem

The present disclosure is designed to solve the problems of the related art, and therefore the present disclosure is directed to providing a battery pack, which may prevent a gap from being generated at a handle by blocking loosening of a screw even in a continuous vibration environment.

Technical Solution

In one aspect of the present disclosure, there is provided a battery pack, comprising: a case configured to accommodate battery cells; and a handle attached to an outer side of the case, wherein the handle includes: a handle bottom cover fixedly coupled to the case by a screw member; a handle plate disposed to be layered on the handle bottom cover and having a perforated hole through which the screw member passes; and a handle top cover configured to cover the handle plate and coupled to the handle bottom cover, wherein the handle plate has a thread formed in the perforated hole, and wherein the handle top cover includes a screw loosening prevention member formed to protrude on an inner surface thereof and configured to press a top end of the screw member located at an upper surface of the handle plate.

The screw member may be configured to be screwed to the perforated hole and a fastening groove formed at the case, respectively.

The screw member may include a head portion configured to form the top end of the screw member; and a shaft portion configured to extend from the head portion to pass through the handle plate and the handle bottom cover so that a distal end thereof is interposed in the fastening groove.

The head portion may have a screwdriver groove configured to rotate by a screwdriver and an expansion plate formed to radially extend from the screwdriver groove.

The screw loosening prevention member may be configured to be in perpendicular contact with the expansion plate.

The screw loosening prevention member may be configured in a pipe shape that has an inner diameter greater than the screwdriver groove without exceeding the expansion plate and is in perpendicular contact with the expansion plate.

The expansion plate may have a pin hole formed therethrough in a thickness direction, and the screw loosening prevention member may include an anti-rotation pin configured to be inserted into the pin hole.

The screw loosening prevention member may be configured in a pipe shape that has an inner diameter greater than the screwdriver groove without exceeding the expansion plate and is in perpendicular contact with the expansion plate, and the anti-rotation pin may be formed to protrude from a bottom end of the pipe shape.

A hooking hole may be formed in any one of the handle bottom cover and the handle top cover, and a hook configured to be hooked in the hooking hole may be provided to the other of the handle bottom cover and the handle top cover.

The case may include a case housing; and a case cover coupled to the case housing, wherein the case cover may be formed to be concave between a left side portion and a right side portion thereof, and the handle may be configured such that both ends thereof are fixedly coupled to the left side portion and the right side portion.

The screw member may have a distal end fixed to a fastening groove formed at the case, and the fastening groove may include an insert nut, and the insert nut has a sawtooth pattern formed at an outer side thereof along a circumferential direction.

In another aspect of the present disclosure, there is also provided an electric scooter, comprising the battery pack described above.

Advantageous Effects

According to an embodiment of the present disclosure, it is possible to provide a battery pack, which may prevent a gap from being generated at a handle by blocking loosening of a screw even in a continuous vibration environment.

The effect of the present disclosure is not limited to the above, and effects not mentioned herein will be clearly understood by those skilled in the art from this specification and the accompanying drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
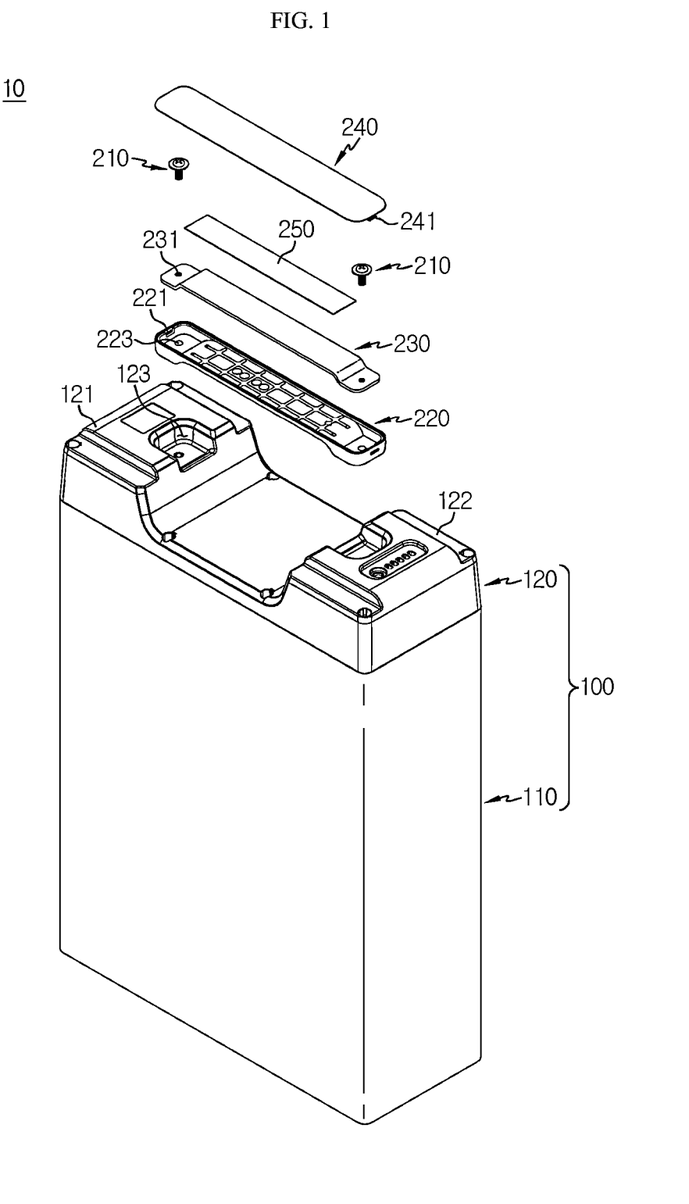
FIG. 1 is an exploded perspective view showing a case and a handle, employed at a battery pack according to an embodiment of the present disclosure.
Figure 2:
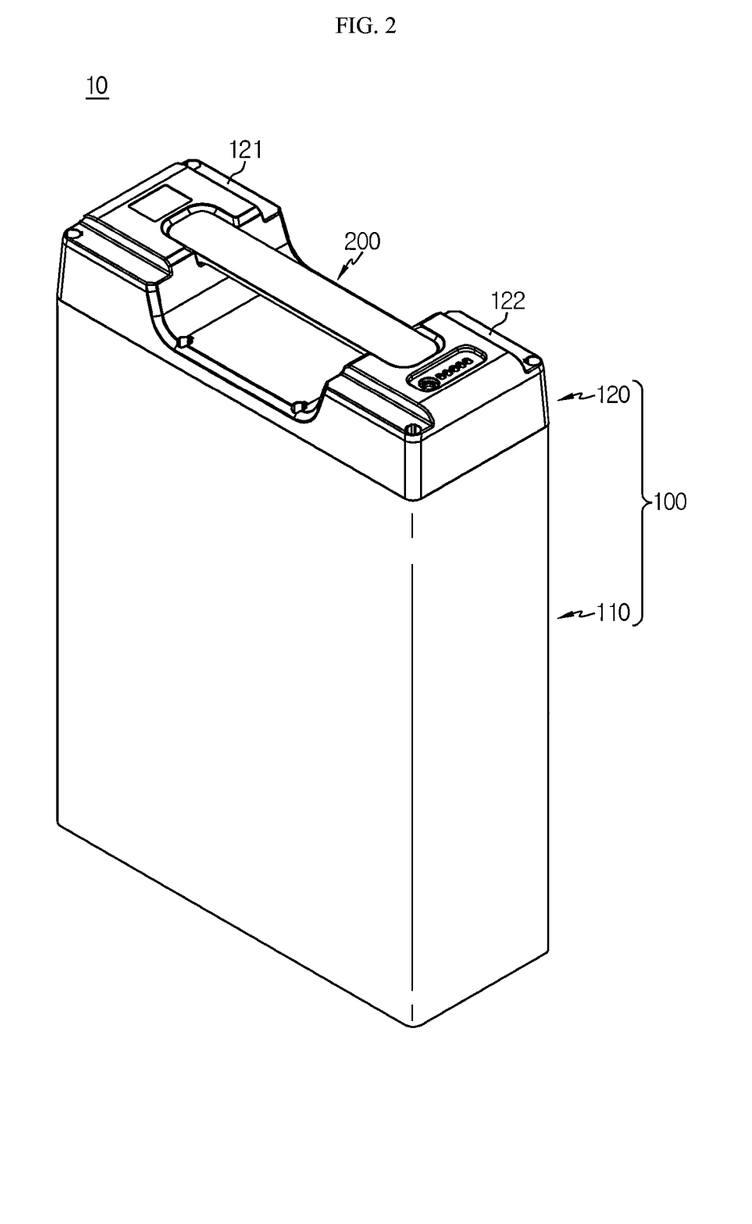
FIG. 2 is an assembled perspective view showing the battery pack of FIG. 1.

FIG. 1 is an exploded perspective view showing a case and a handle, employed at a battery pack according to an embodiment of the present disclosure, and FIG. 2 is an assembled perspective view showing the battery pack of FIG. 1.

Referring to these drawings, a battery pack 10 according to an embodiment of the present disclosure includes battery cells (not shown), a case 100 for accommodating the battery cells, and a handle 200 attached to an outer side of the case 100.

The battery cells may be lithium secondary batteries having a high energy density per unit weight. The lithium secondary battery may be classified depending on the shape of an exterior material into a can-type secondary battery in which an electrode assembly is accommodated into a metal can and a pouch-type secondary battery in which the electrode assembly is accommodated in a laminate sheet-type pouch.

The pouch-type secondary battery has advantages of easy stacking and high energy density, but has a disadvantage since it is weak against external impact due to low mechanical rigidity. Meanwhile, the can-type secondary battery has superior mechanical rigidity, so its durability against external impact is superior to that of the pouch-type secondary battery. In this regard, in the battery pack 10 of this embodiment, the can-type secondary battery may be employed as a battery cell. Of course, the scope of the present disclosure is not limited to the can-type lithium secondary battery. The can-type lithium secondary battery may be replaced with the pouch-type lithium secondary battery, or a secondary battery other than a lithium secondary battery such as a nickel-cadmium battery or a nickel-hydrogen battery.

The case 100 may include a case housing 110 and a case cover 120 coupled to the case housing 110.

The case housing 110 may be provided in a box shape with one side open.

Although not shown in order not to obscure the gist of the present disclosure, a cell module assembly including battery cells, a frame capable of holding the battery cells, a metal plate for electrically connecting the battery cells, a harness wire for voltage sensing, and a BMS for controlling the charging and discharging of the battery cells and a current sensor may be accommodated in the case housing 110.

The case cover 120 is configured to cover the opening of the case housing 110, and may be coupled to the case housing 110 by bolting and hooking the case housing 110.

In addition, as shown in FIGS. 1 and 2, the case cover 120 may include a left side portion 121 and a right side portion 122 protruding in a substantially "U" shape, and a concave form may be formed between them. The configuration of the case cover 120 has an advantage that when both ends of the handle 200 are fixedly coupled to the left side portion 121 and the right side portion 122, a space for a user to hold the handle 200 may be easily secured. In particular, even if the external shape of the handle 200 is made in a very simple shape as in this embodiment, the user may easily hold the handle 200.

Seeing the configuration of the case cover 120 according to this embodiment in more detail, the case cover 120 further includes a handle installation groove 123 that is shaped such that a left end and a right end of the handle 200 are respectively fit into the left side portion 121 and the right side portion 122. The handle installation groove 123 may act to accurately guide an assembly position of the handle 200 and hold the handle 200 not to be twisted in case of shock or vibration.

Figure 3:
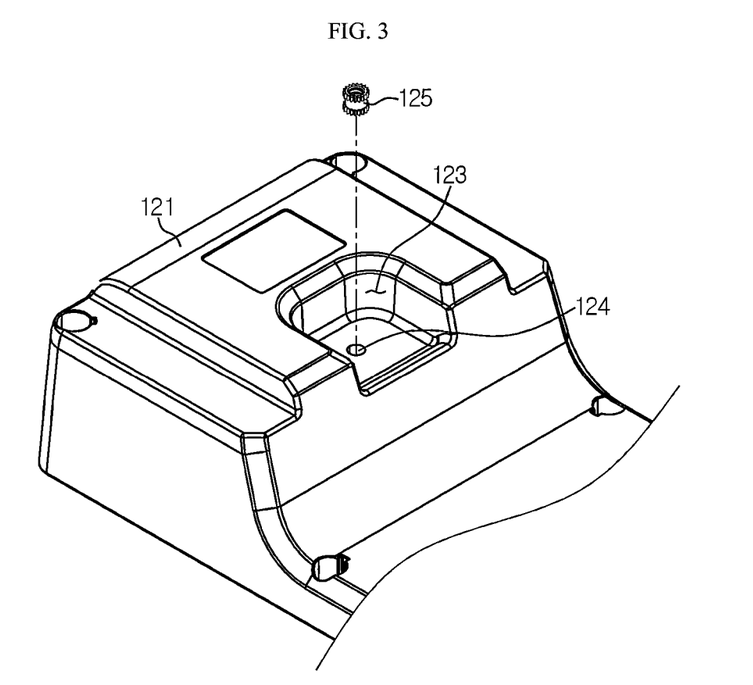
FIG. 3 is a diagram showing a portion of a case cover and an insert nut of FIG. 1.

In addition, as shown in FIG. 3, a fastening groove 124 may be provided at a bottom surface of the handle installation groove 123. The fastening groove 124 may be provided to be recessed to a predetermined depth from the surface of the bottom surface, and an insert nut 125 may be provided in the fastening groove 124. For reference, the insert nut 125 may be interposed in the fastening groove 124 of the case cover 120 by insert molding. The insert nut 125 has a sawtooth pattern on its outer surface along a circumferential direction and thus may sufficiently withstand the torque of a screw member 210.

Meanwhile, the handle 200 according to the present disclosure has a handle loosening prevention structure that prevents the screw from loosening in an environment where continuous vibration is applied to the battery pack 10.

Seeing main components of the handle 200 according to the present disclosure, the handle 200 includes a screw member 210, a handle bottom cover 220, a handle plate 230, and a handle top cover 240.

The screw member 210 is a means for fixing the handle bottom cover 220 to the case cover 120, and may be screwed to the fastening groove 124 of the case cover 120. Any type of screw member 210 may be used as long as a screw capable of being screwed into the fastening groove 124 is formed.

Figure 6:
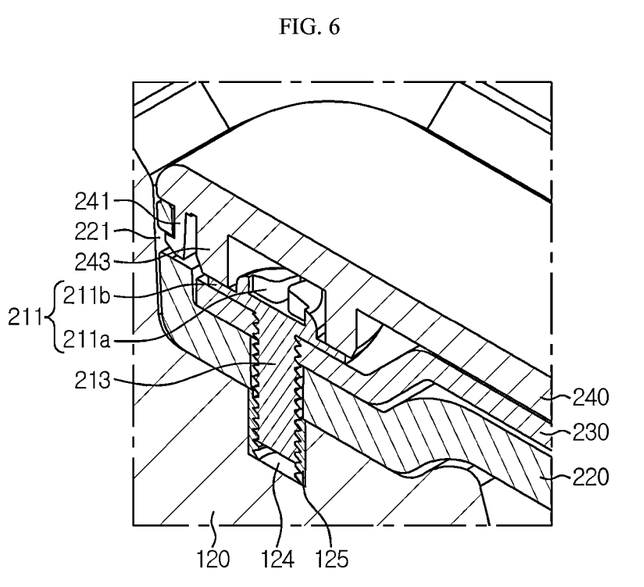
FIG. 6 is a sectional view showing a coupled structure of the case cover and a screw of the handle at the battery pack of FIG. 2.

Specifically, referring to FIGS. 1 and 6, the screw member 210 according to this embodiment may include a head portion 211 having a larger diameter and a shaft portion 213 having a smaller diameter than the head portion 211 and having a screw formed on an outer circumferential surface thereof.

The head portion 211 may include a screwdriver groove 211a provided to be rotated by a screwdriver and an expansion plate 211b extending radially from the screwdriver groove 211a. In this embodiment, the screwdriver groove 211a has a cross shape, but the screwdriver groove 211a may be replaced with a straight or hexagon wrench groove shape as desired. The expansion plate 211b may be provided in a disk shape around the screwdriver groove 211a. However, the expansion plate 211b does not have to be in a disk shape, and may be provided in a triangular plate shape or a square plate shape.

The shaft portion 213 may be provided to extend from the head portion 211 and pass through the handle plate 230 and the handle bottom cover 220 so that a distal end thereof may be fixed in a state of being screwed into the fastening groove 124 of the case cover 120. For reference, the specifications such as thickness or length of the shaft portion 213 may be variously determined according to the specifications of the handle plate 230, the handle bottom cover 220 and the fastening groove 124.

The handle bottom cover 220 is a part that is fixedly coupled to the case cover 120 by the screw member 210, and may be injection-molded with a plastic material.

The handle bottom cover 220 may be provided to accommodate the handle plate 230 and to be coupled to and released from the handle top cover 240. At this time, a hook fastening method may be applied to facilitate coupling and releasing. To this end, in this embodiment, a hooking hole 221 is formed in the handle bottom cover 220, and a hook 241 capable of being hooked into the hooking hole 221 is provided at the handle top cover 240. Of course, contrary to this embodiment, it is also possible that the hook 241 is provided at the handle bottom cover 220 and the hooking hole 221 is provided in the handle top cover 240.

The handle bottom cover 220 may have a length corresponding to a linear distance between the left side portion 121 and the right side portion 122 of the case cover 120, and may be configured to have bottom grooves 223 formed at both ends thereof such that the screw member 210 is inserted therein. If both ends of the handle bottom cover 220 are aligned with the handle installation groove 123 of the left side portion 121 of the case cover 120 and the handle installation groove 123 of the right side portion 122 of the case cover 120, the bottom groove 223 and the fastening groove 124 may be naturally matched up and down.

The handle plate 230 is a part arranged in a layer form on the handle bottom cover 220 and fixedly coupled to the case cover 120 together with the handle bottom cover 220 by the screw member 210. Both ends of the handle plate 230 are provided with perforated holes 231 through which the screw member 210 may pass, and the handle plate 230 may be arranged in a layer form on the handle bottom cover 220 so that the perforated hole 231 is matched with the bottom groove 223.

The handle plate 230 may be made of a metal material such as stainless steel. By adding the handle plate 230 with high strength on the handle bottom cover 220 made of plastic, it is possible to prevent the handle bottom cover 220 from being damaged when the screw member 210 is fastened thereto, and it is possible to strengthen the mechanical strength of the handle 200.

Figure 4:
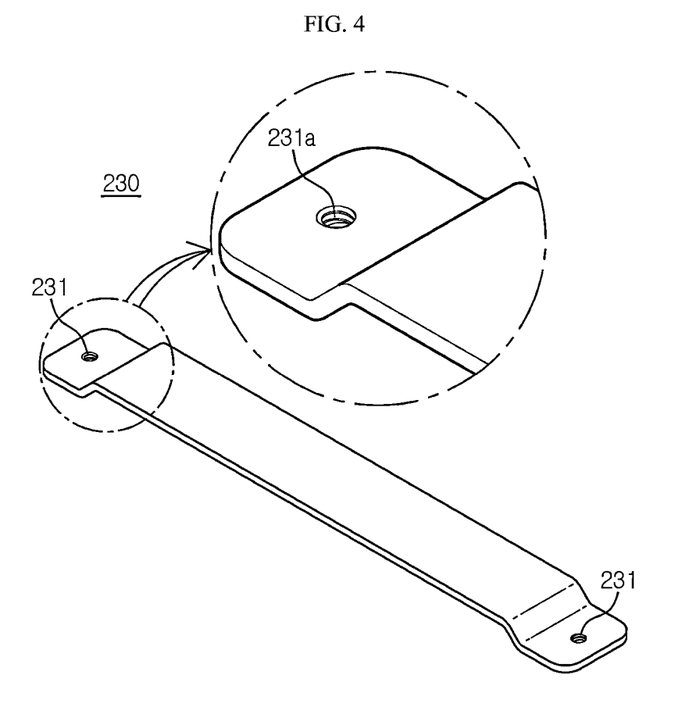
FIG. 4 is an enlarged view showing a handle plate and a perforated hole of FIG. 1.

In particular, as shown in FIG. 4, the handle plate 230 of the present disclosure further includes a thread 231a formed in the perforated hole 231 so as to be screwed with the screw member 210. The thread 231a is formed in the perforated hole 231 as above in order to provide a structure for forcing the screw member 210 to rise above the handle plate 230 when the screw member 210 is loosened. This will be described later in more detail.

The handle top cover 240 is a part that covers the handle plate 230 and is coupled with the handle bottom cover 220, and may be injection-molded with the same plastic material as the handle bottom cover 220. As described above, the handle top cover 240 may be fixedly coupled to the handle bottom cover 220 by hooking the hook 241 into the hooking hole 221 of the handle bottom cover 220. Additionally, an adhesion sheet 250 may be added between the handle plate 230 and the handle top cover 240 to further strengthen the fixability of the handle top cover 240.

Figure 5:
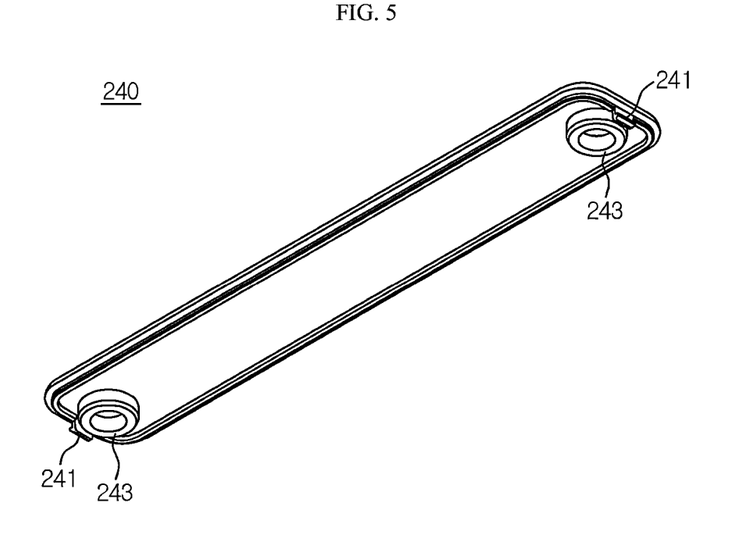
FIG. 5 is a perspective view showing a handle top cover of FIG. 1, observed from the below.

In particular, as shown in FIG. 5, the handle plate 230 according to the present disclosure includes a screw loosening prevention member 243.

The screw loosening prevention member 243 may be configured to protrude from an inner surface (a lower surface) of the handle top cover 240 and to press a top end of the screw member 210, namely the head portion 211, located on the upper surface of the handle plate 230.

The screw loosening prevention member 243 according to this embodiment is positioned at both ends of the handle top cover 240, and may be provided to perpendicularly contact the expansion plate 211b of the head portion 211 of the screw member 210. More specifically, as shown in FIG. 6, the screw loosening prevention member 243 may be implemented in a pipe shape having an inner diameter that is greater than the screwdriver groove 211a of the head portion 211 of the screw member 210 and does not exceed the expansion plate 211b.

For example, when the handle plate 230 and the handle bottom cover 220 are integrally fixed to the case cover 120 by the screw member 210 and the handle top cover 240 is coupled to the handle bottom cover 220, the screwdriver groove 211a is placed in the inner space of the pipe shape, and the expansion plate 211b comes into perpendicular contact with the bottom end of the pipe shape.

Hereinafter, the structure for preventing loosening of the handle 200 as above will be described in detail.

After the handle bottom cover 220 and the handle plate 230 are disposed on the case cover 120 in order, the shaft portion 213 of the screw member 210 is interposed into the perforated hole 231, and the screw member 210 is rotated in a clockwise direction by using a screwdriver until the expansion plate 211b of the screw member 210 comes into contact with the upper surface of the handle plate 230, thereby being fastened to the case cover 120. In this case, the shaft portion 213 of the screw member 210 may be screwed into the perforated hole 231 of the handle plate 230 and the fastening groove 124 of the case cover 120, respectively.

After that, the hook 241 of the handle top cover 240 is hooked into the hooking hole 221 of the handle bottom cover 220 so that the handle top cover 240 is coupled with the handle bottom cover 220. At this time, the screw loosening prevention member 243 is in perpendicular contact with the upper surface of the expansion plate 211b.

If the structure for preventing loosening of the handle 200 according to the present disclosure is used, even if a torque is applied to the screw member 210 in a counterclockwise direction due to vibration continuously applied to the battery pack 10, since the screw loosening prevention member 243 presses the expansion plate 211b of the screw member 210 from above, the screw coupling is not loosened.

In other words, the screw loosening prevention member 243 is a means to prevent the screw member 210 from rising upward, and in order to utilize this screw loosening prevention member 243, the thread 231a is further added to the perforated hole 231 of the handle plate 230.

For example, assuming that torque is applied to the screw member 210 in a counterclockwise direction in a state where the thread 231a is not provided to the perforated hole 231 of the handle plate 230, as the screw member 210 is loosened in the counterclockwise direction inside the fastening groove 124, the entire handle 200 rises upward. That is, in this case, even if the screw loosening prevention member 243 is in contact with the expansion plate 211b, since the entire handle 200 rises in that state, the screw loosening prevention member 243 cannot function properly.

Meanwhile, in the same situation as above, if the thread 231a is provided to the perforated hole 231 of the handle plate 230 and the screw member 210 is doubly screwed into the fastening groove 124 and the perforated hole 231, the screw member 210 is able to rise upward only when its screw coupling is loosened from both the fastening groove 124 and the perforated hole 231. However, since the screw loosening prevention member 243 presses the screw member 210 perpendicularly not to rise above the handle plate 230, the screw member 210 is not loosened from both the perforated hole 231 and the fastening groove 124.

Therefore, in the battery pack 10 according to the present disclosure, since the handle 200 is fixed to the case cover 120 as described above, the handle 200 may not be separated even in a continuous vibration environment.

Figure 7:
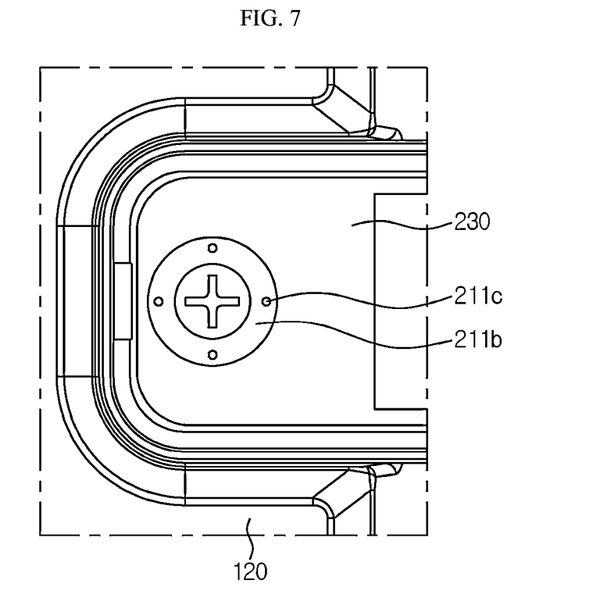
FIG. 7 is a diagram showing a screw member according to another embodiment of the present disclosure.
Figure 8:
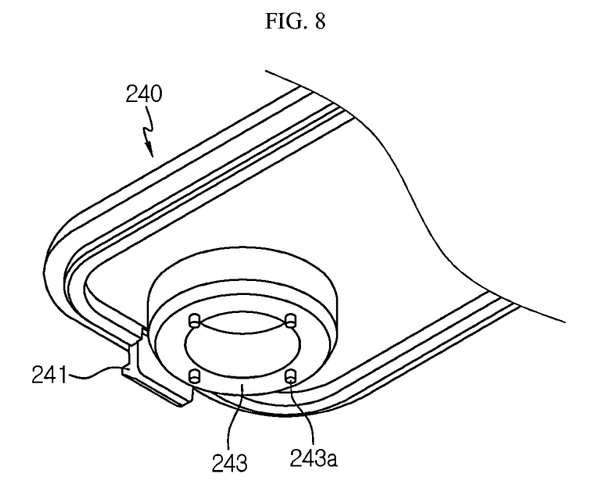
FIG. 8 is a diagram showing a screw loosening prevention member according to another embodiment of the present disclosure.
Figure 9:
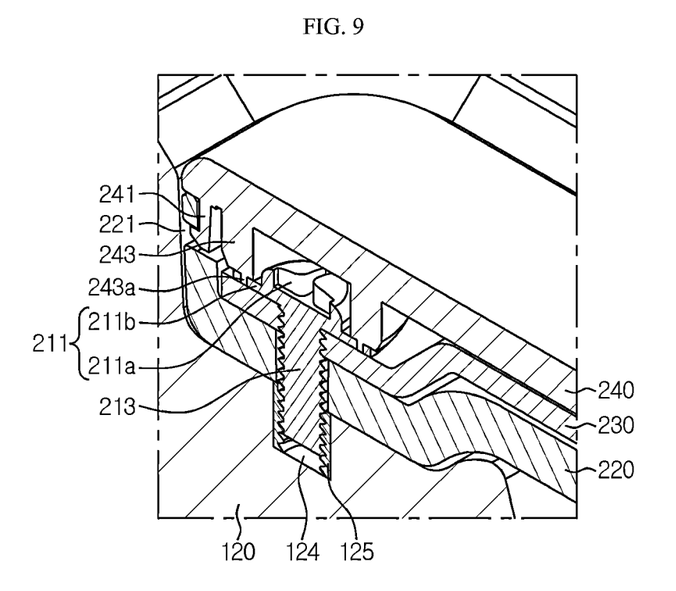
FIG. 9 is a sectional view showing a screwing structure of the case cover and the handle according to another embodiment of the present disclosure.

FIG. 7 is a diagram showing a screw member according to another embodiment of the present disclosure, FIG. 8 is a diagram showing a screw loosening prevention member 243 according to another embodiment of the present disclosure, and FIG. 9 is a sectional view showing a screwing structure of the case cover 120 and the handle 200 according to another embodiment of the present disclosure.

Next, another embodiment of the present disclosure will be described with reference to FIGS. 7 to 9. The same reference numerals denote the same members, and the same members will not be described again, and features different from the former embodiment will be mainly described.

Another embodiment of the present disclosure is substantially identical to the former embodiment, except for the screw member 210 and the screw loosening prevention member 243.

As shown in FIG. 7, the screw member 210 according to this embodiment may further include a pin hole 211c formed through the expansion plate 211b in a thickness direction. At least one pin hole 211c may be provided along a circumferential direction of the expansion plate 211b.

In addition, as shown in FIG. 8, the screw loosening prevention member 243 according to this embodiment may further include an anti-rotation pin 243a provided to be inserted into the pin hole 211c.

The anti-rotation pin 243a is formed to protrude further downward from the bottom end of the pipe shape and may be provided in a one-to-one relationship with the pin hole 211c.

After the handle plate 230 and the handle bottom cover 220 are fixed to the case cover 120 by the screw member 210, while the handle top cover 240 is being coupled to the handle bottom cover 220, the anti-rotation pin 243a may be interposed into the pin hole 211c of the screw member 210 as shown in FIG. 9.

According to the configuration of this embodiment as above, since the anti-rotation pin 243a is interposed into the pin hole 211c of the screw member 210, the rotation of the screw member 210 may be blocked during vibration. In this case, even if the thread 231a is not provided to the perforated hole 231, the screw member 210 itself cannot rotate, so the screw coupling may not be loosened in the fastening groove 124.

In addition, in the former embodiment, the screw loosening prevention member 243 having a pipe shape is able to press the screw member 210 perpendicularly because the handle top cover 240 is hooked to the handle bottom cover 220. However, if a very large torque is applied due to vibration, the hook 241 may be damaged as an external force is concentrated on the hook 241.

However, in this embodiment, the force applied to the hook 241 may be distributed since the screw loosening prevention member 243 acts to press the screw member 210 perpendicularly and simultaneously hold the screw member 210 not to rotate. Therefore, according to this embodiment, even if vibration is continuously applied to the battery pack 10, it is possible to prevent the screw member 210 from being loosened, in a more stable way.

Meanwhile, the battery pack 10 according to the present disclosure described above may be applied to an electric scooter. That is, the electric scooter according to the present disclosure may include the battery pack 10 as a power source. The use of the battery pack 10 is not necessarily limited to an electric scooter, and the battery pack 10 may also be applied to, for example, an electric quick board, an electric vehicle, an energy storage device, and the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:
1. A battery pack, comprising:
a case configured to accommodate battery cells; and
a handle attached to an outer side of the case,
wherein the handle includes:
a handle bottom cover fixedly coupled to the case by a screw member;

a handle plate disposed on the handle bottom cover and having a hole through which the screw member passes; and a handle top cover configured to cover the handle plate and coupled to the handle bottom cover, wherein the handle plate has a thread formed in the hole, and wherein the handle top cover includes a screw loosening prevention member protruding from an inner surface thereof and pressing a top surface of a top end of the screw member disposed above an upper surface of the handle plate, the screw loosening prevention member being configured to hold the top end of the screw member.

2. The battery pack according to claim 1, wherein the screw member is configured to be screwed to the hole and a fastening groove of the case, respectively.

3. The battery pack according to claim 2, wherein the screw member includes:

a head portion at the top end of the screw member; and a shaft portion configured to extend from the head portion to pass through the handle plate and the handle bottom cover so that a distal end thereof is interposed in the fastening groove.

4. The battery pack according to claim 3, wherein the head portion has a screwdriver groove configured to rotate by a screwdriver and an expansion plate radially extending from the screwdriver groove.

5. The battery pack according to claim 4, wherein the upper surface is disposed on the expansion plate, and wherein the screw loosening prevention member is configured to be in perpendicular contact with the upper surface of the expansion plate.

6. The battery pack according to claim 4, wherein the screw loosening prevention member is configured in a pipe shape that has an inner diameter greater than the screwdriver groove without exceeding the expansion plate and is in perpendicular contact with the expansion plate.

7. The battery pack according to claim 4, wherein the expansion plate has a pin hole formed therethrough in a thickness direction, and wherein the screw loosening prevention member includes an anti-rotation pin configured to be inserted into the pin hole.

8. The battery pack according to claim 7, wherein the screw loosening prevention member is configured in a pipe shape that has an inner diameter greater than the screwdriver groove without exceeding the expansion plate and is in perpendicular contact with the expansion plate, and wherein the anti-rotation pin is formed to protrude from a bottom end of the pipe shape.

9. The battery pack according to claim 1, wherein a hooking hole is disposed in any one of the handle bottom cover and the handle top cover, and a hook configured to be hooked in the hooking hole is provided to the other of the handle bottom cover and the handle top cover.

10. The battery pack according to claim 1, wherein the case includes:

a case housing; and a case cover coupled to the case housing, and wherein the case cover is formed to be concave between a left side portion and a right side portion thereof, and the handle is configured such that both ends thereof are fixedly coupled to the left side portion and the right side portion.

11. The battery pack according to claim 1, wherein the screw member has a distal end fixed to a fastening groove of the case, and wherein the fastening groove includes an insert nut, and the insert nut has a sawtooth pattern formed at an outer side thereof along a circumferential direction configured to engage the distal end of the screw member.

12. An electric scooter, comprising the battery pack according to claim 1.

13. The battery pack according to claim 1, wherein the top end of the screw member includes an expansion plate having a disk shape extending radially from a head portion, wherein the upper surface is disposed on the expansion plate, and wherein the screw loosening prevention member is in contact with the upper surface of the expansion plate.

14. The battery pack according to claim 13, wherein the case includes an insert nut, and the screw member has a distal end fixed to the insert nut of the case.

* * * * *